(12) United States Patent
Jensen et al.

(10) Patent No.: US 10,968,893 B2
(45) Date of Patent: Apr. 6, 2021

(54) WIND TURBINE COMPRISING A PARKING STRUCTURE FOR CARRYING THE ROTOR DURING REMOVAL OF THE NACELLE

(71) Applicant: Vestas Wind Systems A/S, Aarhus (DK)

(72) Inventors: Ivar J. B. K. Jensen, Hornslet (DK); Gunnar K. Storgaard Pedersen, Skjern (DK); Henrik Kudsk, Harlev J (DK)

(73) Assignee: Vestas Wind Systems A/S, Aarhus (DK)

( * ) Notice: Subject to any disclaimer, the term of this patent is extended or adjusted under 35 U.S.C. 154(b) by 87 days.

(21) Appl. No.: 16/300,673

(22) PCT Filed: Jun. 27, 2017

(86) PCT No.: PCT/DK2017/050212
§ 371 (c)(1),
(2) Date: Nov. 12, 2018

(87) PCT Pub. No.: WO2018/001429
PCT Pub. Date: Jan. 4, 2018

(65) Prior Publication Data
US 2019/0145380 A1    May 16, 2019

(30) Foreign Application Priority Data

Jun. 27, 2016 (DK) .................. 2016 70458

(51) Int. Cl.
*F03D 13/20* (2016.01)
*F03D 1/02* (2006.01)
*F03D 80/50* (2016.01)

(52) U.S. Cl.
CPC .............. *F03D 13/20* (2016.05); *F03D 1/02* (2013.01); *F03D 80/50* (2016.05);
(Continued)

(58) Field of Classification Search
CPC .................................. F03D 13/00; F03D 1/02
See application file for complete search history.

(56) References Cited

U.S. PATENT DOCUMENTS

| 2009/0196748 A1* | 8/2009 | Salter ...................... F03D 80/50 416/120 |
| 2011/0024233 A1* | 2/2011 | Lott ........................ F03D 80/55 182/129 |
| 2012/0141292 A1 | 6/2012 | Signore et al. |

FOREIGN PATENT DOCUMENTS

| CN | 101707951 A | 5/2010 |
| CN | 201483408 U | 5/2010 |

(Continued)

OTHER PUBLICATIONS

China National Intellectual Property Administration, First Notification of Office Action in CN Application No. 201780039473.4, dated Oct. 9, 2019.

(Continued)

*Primary Examiner* — Juan G Flores
(74) *Attorney, Agent, or Firm* — Wood Herron & Evans LLP

(57) ABSTRACT

A wind turbine comprising a tower structure configured to hold a nacelle with a rotor and a parking structure for holding the rotor. To improve the ability to carry out maintenance and to allow easier assembly and disassembly of the wind turbine, the parking structure is configured to connect the rotor directly to the tower structure to thereby allow removal of the nacelle while the rotor remains fixed to the tower structure.

7 Claims, 4 Drawing Sheets

(52) U.S. Cl.
CPC ..... *F05B 2230/80* (2013.01); *F05B 2240/912* (2013.01); *Y02E 10/72* (2013.01)

(56) References Cited

FOREIGN PATENT DOCUMENTS

| | | |
|---|---|---|
| CN | 103354873 A | 10/2013 |
| DK | 201070309 A | 7/2011 |
| EP | 1617075 A1 | 1/2006 |
| EP | 2434142 A1 | 3/2012 |
| FR | 2903739 A1 | 1/2008 |
| GB | 2443886 A | 5/2008 |
| KR | 20140001703 A | 1/2014 |
| WO | 0034650 A1 | 6/2000 |
| WO | 2011099916 A1 | 8/2011 |
| WO | 2013182198 A1 | 12/2013 |

OTHER PUBLICATIONS

European Patent Office, International Search Report and Written Opinion in PCT Application No. PCT/DK2017/050212, dated Sep. 29, 2017.

Danish Patent and Trademark Office, Search and Examination Report in PA 2016 70458, dated Feb. 1, 2017.

\* cited by examiner

WIND TURBINE COMPRISING A PARKING STRUCTURE FOR CARRYING THE ROTOR DURING REMOVAL OF THE NACELLE

INTRODUCTION

The invention relates to a wind turbine.

BACKGROUND OF THE INVENTION

Wind turbines normally comprise a rotor with blades, the rotor being arranged to rotate by wind energy. The rotor drives a drive train which typically includes a generator which converts the energy to electricity. The drive train may include a gearbox for changing the rotor speed to a speed which is suitable for the generator. Some generators are directly driven by the rotor.

The drive train is carried by a frame and housed in a nacelle mounted at a top end of a vertical tower.

Herein, we use the term "energy generating unit" to express the nacelle, the rotor with blades, and the drive train including generator and optionally with a gearbox and other components necessary for the energy conversion. In a traditional horizontal axis wind turbine, the energy generating unit is placed on top of the vertical tower carried by a bearing allowing the energy generating unit to rotate in a substantially horizontal plane, or typically directed 5-15 degrees from horizontal to thereby face the direction of the wind. Access to the interior of the nacelle for inspection and maintenance is through the interior of the tower, and replacement of large components such as the gearbox or generator from the nacelle can be difficult and require costly crane operations.

In multirotor wind turbines, several energy generating units are carried by the same tower structure. The tower structure typically combines one or more vertical towers with one or more suspension arms extending at an angle from the tower and holding at least one energy generating unit. In such multirotor wind turbines, inspection and maintenance of the nacelle and internal components may be carried out by lowering the complete energy generating unit including nacelle and rotor with blades.

DESCRIPTION OF THE INVENTION

It is an object of embodiments of the invention to facilitate easier, cheaper and/or safer maintenance and inspection of the nacelle of a wind turbine.

According to a first aspect, the invention provides a wind turbine comprising:

a nacelle carrying a drive train;
 a rotor with blades, the rotor configured to be carried by the drive train;
 a tower structure comprising a vertical tower and at least one suspension arm extending outwards from the tower and configured to carry the nacelle; and
 a parking structure configured to connect the rotor to the tower structure for carrying the rotor during removal of the nacelle.

Due to the parking structure, the nacelle of the wind turbine can be disconnected from the rotor and lowered to the ground. This operation may be carried out without lowering the, typically very long, blades of the wind turbine. Accordingly, the nacelle may be inspected, serviced, or replaced by work at a low altitude while the blades are suspended on the rotor by the parking structure at high altitude. This leaves more space around the nacelle, it prevents the safety related issues associated with handling and lowering of the long blades, and it prevents damaging the fragile blades during handling. Further, it allows fast maintenance by replacement of a complete nacelle and drive train.

In the present context, the term 'tower structure' should be interpreted to mean a structure, arranged to carry the nacelle and rotor of the wind turbine. The invention may be particularly relevant in connection with a multirotor wind turbine. In the present context the term 'multirotor wind turbine' should be interpreted to mean a wind turbine comprising two or more energy generating units mounted on one tower structure. In This embodiment, the tower structure typically comprises a vertical tower and at least one suspension arm extending outwards from the tower, each suspension arm holding a nacelle with a rotor.

The tower structure may comprise a number of tower segments, which are assembled to form the tower structure. The parking structure may be connected to the rotor and be inserted between, or be attached to these tower segments and thus connect the rotor directly to the tower structure.

The angle between the suspension arms and the tower may be fixed or it may be variable, e.g. for the purpose of changing the height of the energy generating unit with respect to ground, e.g. for maintenance purpose, or for protection against strong wind etc.

The nacelle and rotor may be arranged at or near the ends of the suspension arm, i.e. furthest away from the tower which holds the suspension arm.

The parking structure is particularly configured to attach the rotor directly to the suspension arm and to carry the weight of the rotor when separated from the nacelle. Accordingly, the nacelle can be lowered to the ground. The invention may thus relate to a wind turbine where the rotor is connected to the tower structure by the parking structure and where the nacelle is released from the tower structure.

Each suspension arm may be attached to the tower via a yaw arrangement whereby the suspension arm is allowed to perform yawing movements with respect to the tower which holds the suspension arm. This will allow the rotors of the energy generating units to be directed against the wind direction. The parking structure may particularly be attachable to the suspension arm at a position where the parking structure is moved together with the nacelle and rotor by the yaw arrangement.

In the present context the term 'nacelle' should be interpreted as that part of the wind turbine housing a drive train including a shaft which is connected to and driven by the rotor, the nacelle typically comprises a frame which supports the components of the drive train, e.g. a gearbox, a generator, and which may further support other components, e.g. electronic components such as a power converter, cooling equipment and similar components located at the top of the tower structure.

The parking structure may extend from the tower structure to a position between the nacelle and the rotor. Particularly, the parking structure may form a plate-shaped, essentially plane, element extending in the space between the rotor and the nacelle. Particularly, the parking structure may thereby enable removal of the nacelle and the frame which supports the components of the drive train while the rotor remains suspended directly on the tower structure.

The rotor typically forms a flange by which the rotor is fixed to the drive shaft of the drive train. The parking structure may particularly include a structure configured to fix the parking structure to this flange of the rotor.

Particularly, the parking structure may be configured for reuse on a number of wind turbines. Accordingly, the parking structure may be releasably attached to the tower structure and releasably attached to the rotor. In this way, the parking structure is attached only when the nacelle is to be released, and it is detached during normal operation of the turbine.

The parking structure may comprise an alignment structure. The alignment structure is configured to allow movement of the rotor relative to the tower structure while the rotor is connected to the tower structure by the parking structure. In that way, the nacelle can be attached to the tower structure, and subsequently, the alignment structure can be utilized for adjusting the position of the rotor until it correctly matches the position of the nacelle.

The alignment structure may be configured to allow movement of the rotor while the nacelle is down for maintenance. The alignment structure may e.g. be configured to move the rotor between an operation position where the rotor is free to rotate about the rotor axis and a maintenance position where the blades are very close to the tower structure or even intersects the tower structure. When the blades come close to, or intersects the tower structure, rotation of the rotor can more easily be prevented which increases safety, and maintenance or inspection of the blades can be carried out from the tower structure.

The alignment structure may also be configured for movement of the rotor relative to the nacelle while the nacelle is fixed to the tower structure and the rotor is connected to the tower structure by the parking structure. This option may facilitate aligning of the rotor to the position of the nacelle during reattachment of the rotor to the nacelle.

The alignment structure may comprise measuring means configured to determine a position of the nacelle relative to the rotor while the nacelle is fixed to the tower structure and the rotor is connected to the tower structure by the parking structure. The measuring means may include laser positioning tools etc.

The wind turbine may comprise a crane structure configured to lower the nacelle from the tower structure while the rotor is connected to the tower structure by the parking structure. The crane structure may particularly be attached to the parking structure such that it is attachable or detachable to and from the wind turbine with the parking structure. The crane structure may e.g. include a winch for hoisting the nacelle to and from its position at the tower structure. The crane structure may further include means for moving the nacelle relative to the rotor to thereby facilitate detachment and reattachment of the rotor to the nacelle.

The nacelle could be attached to the tower structure by matching flanges of the nacelle and the tower structure. As an example, the nacelle could be carried by a yaw bearing having a lower flange bolted onto an upper flange of the tower structure. In this embodiment, the parking structure may be attachable to the flange of the tower structure. This is an advantage since the tower already is prepared to carry the weight of the complete nacelle and rotor assembly and therefore typically is capable of carrying the rotor without the nacelle with no or only limited amendments.

As an alternative to the attachment of the parking structure to the upper flange of the tower structure, the nacelle could be attached to the tower structure in the vicinity of that flange, i.e. to a segment of the tower structure which holds the above mentioned flange.

The parking structure may form a platform for access for personnel to work on the rotor or nacelle.

In a second aspect, the invention provides a method of lowering a nacelle of a wind turbine according to the first aspect of the invention. According to the method, the parking structure is attached between the rotor and the tower structure and the nacelle is subsequently released from the rotor and lowered from the tower structure. The method may include the further step of reattaching a nacelle to the rotor by use of the parking structure for aligning the rotor and nacelle. The method may further include the step of lowering the nacelle by use of a crane structure attached to the parking structure.

BRIEF DESCRIPTION OF THE DRAWINGS

The invention will now be described in further detail with reference to the accompanying drawings in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
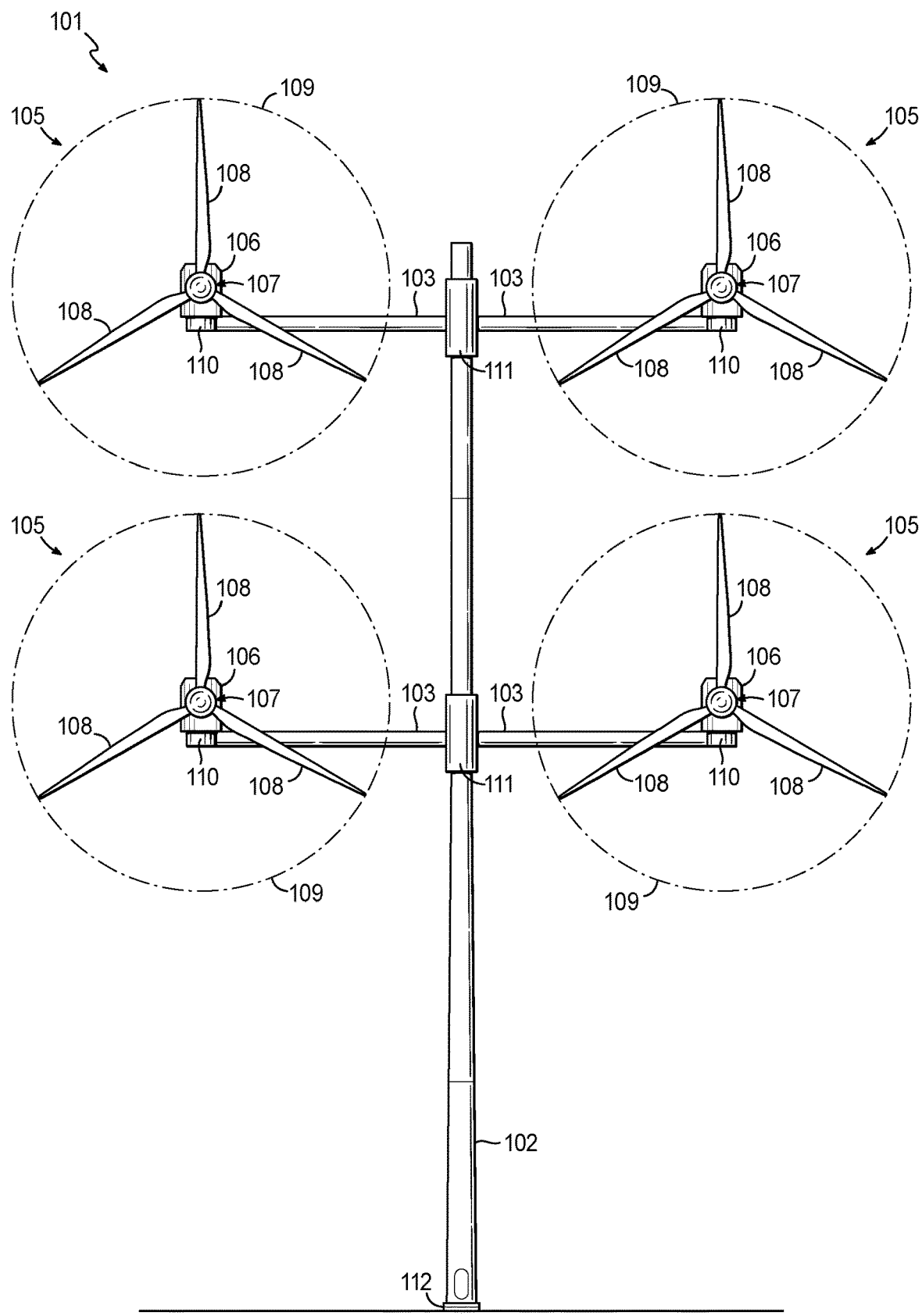
FIG. 1 illustrates a front view of a multirotor wind turbine comprising suspension arms extending from a vertical tower.

FIG. 1 is a front view of a multirotor wind turbine 101 comprising a tower 102 carrying four suspension arms 103. The suspension arms 103 are arranged, in pairs of two, one pair above the other.

The suspension arms in a pair of suspension arms extend in opposite directions away from the tower 102.

Each suspension arm 103 supports an energy generating unit 105. And each energy generating unit 105 comprises a nacelle 106 and a rotor 107 carrying three wind turbine blades 108, sweeping an area 109. Each energy generating unit 105 is connected to a suspension arm via a rotational joint 110.

The suspension arms 103 are attached to the tower 102 via a yaw arrangement 111, allowing the entire suspension arm 103 to perform yawing movements with respect to the tower 102 in order to direct the rotors 107 into the incoming wind.

When the multirotor wind turbine 101 is operational, the energy generating units 105 are placed symmetrically around the tower 102 so that the multirotor wind turbine is balanced.

For maintenance and inspection, the personnel enter the tower via the opening 112 at the base of the tower and access to each energy generating unit is provided inside the tower and inside the corresponding suspension arm.

Figure 2:
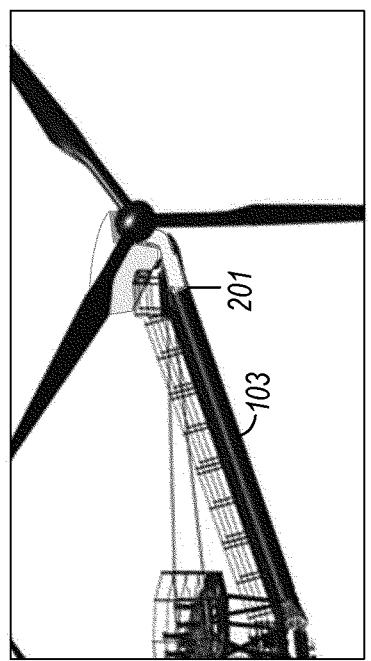
FIGS. 2-4 illustrate a wind turbine with a parking structure according to an embodiment of the invention.
Figure 3:
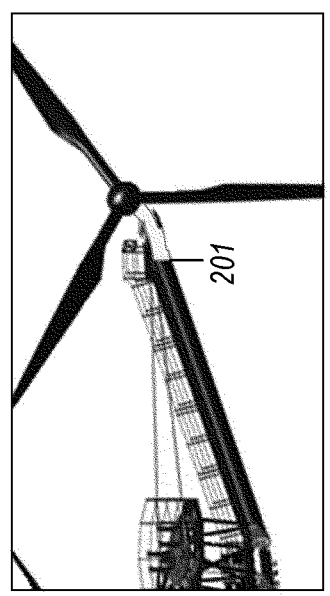
Figure 4:
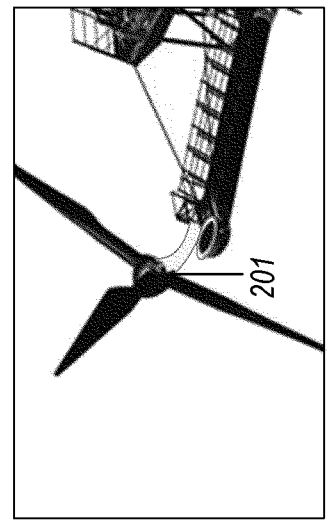

FIGS. 2-4 illustrate one embodiment of the invention where the parking structure 201 is fixed between the rotational joint 110 and the rotor 107. This embodiment is easy to implement even in existing turbines not made specifically for parking structures since the rotational joint is typically capable of carrying the weight of the rotor without amendments. In one embodiment, the parking structure is configured to extend circumferentially about the rotational joint 110, and in one implementation, the parking structure comprises a fixed attachment fixture arranged between the rotational joint and the energy generating unit 105. This fixed fixture will stay in place and allow attachment and/or detachment of a removable parking structure when a nacelle is to be removed from the rotor. In one embodiment, the parking structure is configured to enable locking of the rotational joint 110 to thereby selectively prevent rotation of the energy generating unit during maintenance.

Figure 5:
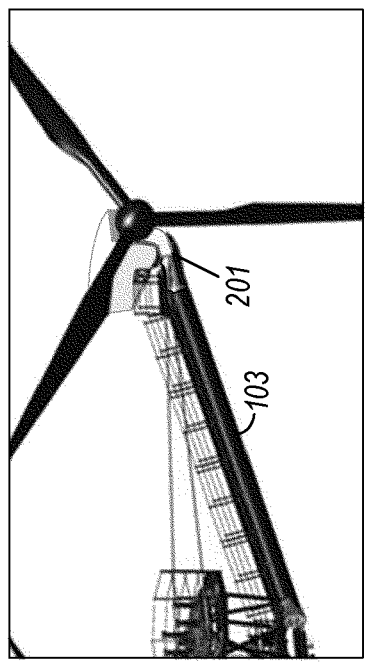
FIG. 5-7 illustrates a wind turbine with a parking structure according to an alternative embodiment of the invention.
Figure 6:
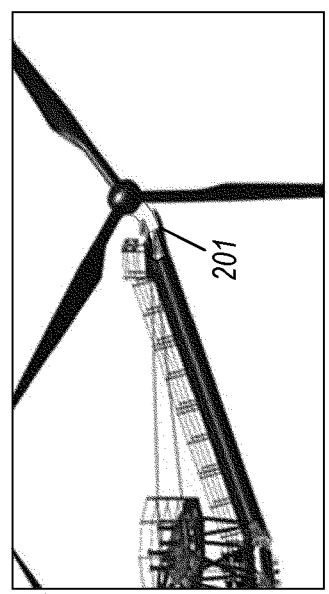
Figure 7:
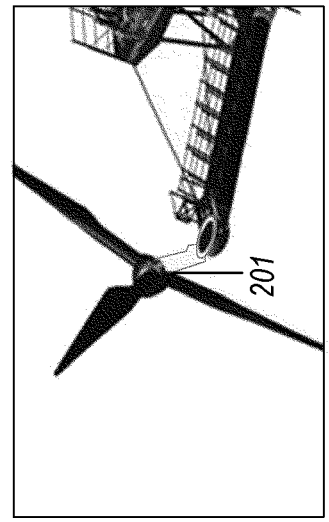

FIGS. 5-7 illustrate another embodiment of the invention where the parking structure 201 is fixed between the suspension arm 103 and the rotor. This embodiment may provide an easy attachment of the parking structure to the tower structure but it typically requires the tower structure, i.e. in this case the suspension arm 103, to be dimensioned specifically for the purpose of carrying the rotor via the parking structure.

Figure 8:
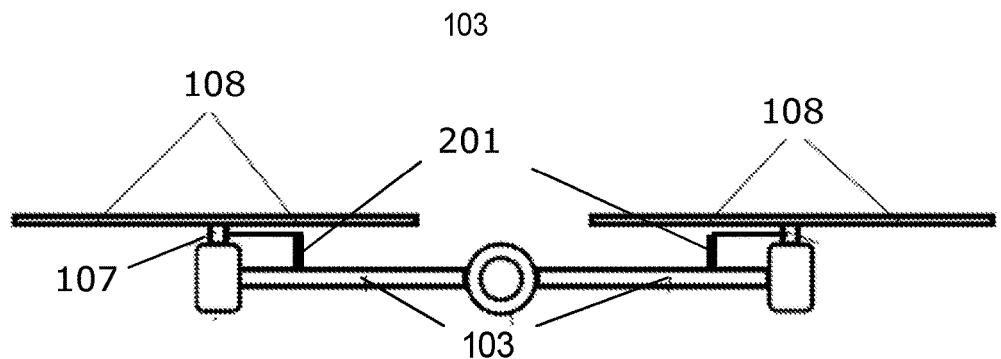
FIG. 8 illustrates a top view of a multirotor wind turbine with a parking structure.
Figure 9:
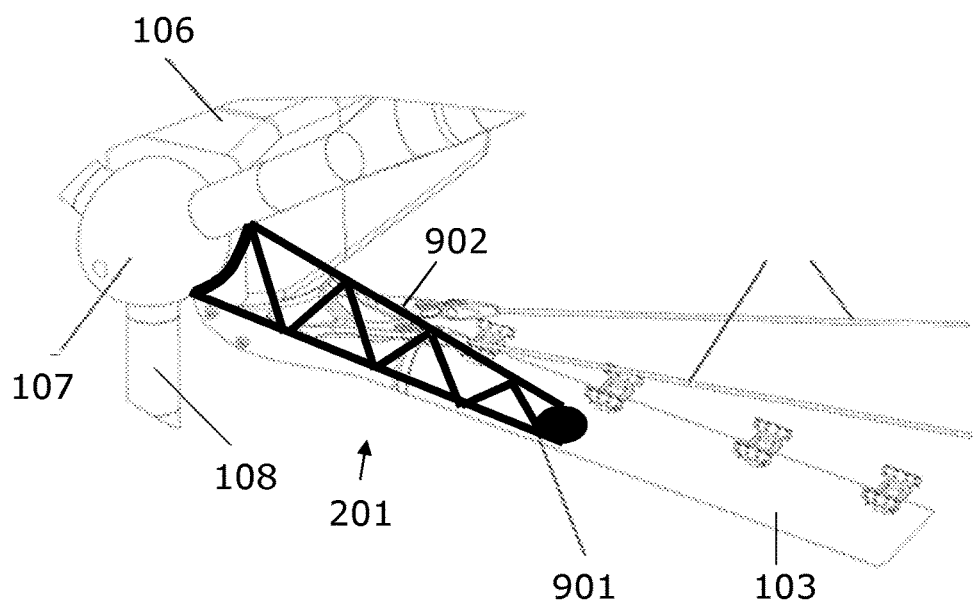
FIG. 9 illustrates a perspective view of a multirotor wind turbine with a parking structure attached to a suspension arm.

In this embodiment, the parking structure may comprise a fixed attachment fixture e.g. by welding to the suspension arm. This fixed fixture will stay in place and allow attachment and/or detachment of a removable parking structure when a nacelle is to be removed from the rotor. In one embodiment, the parking structure is configured to enable locking of the rotational joint 110 to thereby selectively prevent rotation of the energy generating unit during maintenance FIGS. 8 and 9 illustrate the embodiment of FIGS. 5-7 where the parking structure 201 is attached between the suspension arm 103 and the rotor 107. In this embodiment, the parking structure prevents rotation of the energy generating unit 105 relative to the suspension arm and optionally provides a platform from which personnel may access the blades or at least the root end of the blades.

FIG. 9 illustrates further details of the parking structure. In this embodiment, the parking structure 201 is constituted by a lattice structure fixed between the attachment structure 901 and the rotor. The attachment structure 901 is welded to the suspension arm and allows easy and safe attachment and removal of the removable part 902 of the parking structure.

The invention claimed is:

1. A wind turbine comprising:
    a nacelle carrying a drive train;
    a rotor with blades, the rotor configured to be carried by the drive train;
    a tower structure comprising a vertical tower and at least one suspension arm extending outwards from the vertical tower, the at least one suspension arm configured to carry the nacelle; and
    a parking structure configured to connect the rotor to the tower structure for carrying the rotor during removal of the nacelle,
    wherein the rotor is connected to the tower structure, and the nacelle is disconnected from the tower structure.

2. The wind turbine according to claim 1, wherein the parking structure extends from the tower structure to a position between the nacelle and the rotor.

3. The wind turbine according to claim 1, wherein the parking structure is releasably attached to the tower structure and releasably attached to the rotor.

4. The wind turbine according to claim 1, wherein the parking structure forms a platform for access for personnel to work on the rotor or nacelle.

5. The wind turbine according to claim 1, wherein the parking structure is configured to prevent rotation of the rotor.

6. A method of lowering a nacelle of a wind turbine according to claim 1, where the parking structure is attached between the rotor and the tower structure and the nacelle subsequently is released from the rotor and lowered from the tower structure.

7. A wind turbine comprising:
    a tower structure comprising a vertical tower and first and second suspension arms, each suspension arm extending outwards from the vertical tower, each suspension arm including:
        a nacelle carrying a drive train; and
        a rotor with blades, the rotor configured to be carried by the drive train; and
        a parking structure configured to connect the rotor to the tower structure for carrying the rotor during removal of the nacelle,
    wherein each rotor is connected to the tower structure, and each nacelle is disconnected from the tower structure.

* * * * *